US009706586B2

(12) United States Patent
Oguchi

(10) Patent No.: US 9,706,586 B2
(45) Date of Patent: Jul. 11, 2017

(54) WIRELESS COMMUNICATION DEVICE AND METHOD

(71) Applicant: FUJITSU LIMITED, Kawasaki-shi, Kanagawa (JP)

(72) Inventor: Shoko Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/040,128

(22) Filed: Feb. 10, 2016

(65) Prior Publication Data
US 2016/0278137 A1   Sep. 22, 2016

(30) Foreign Application Priority Data

Mar. 18, 2015   (JP) .................................. 2015-054769

(51) Int. Cl.
| | | |
|---|---|---|
| *H04B 7/00* | (2006.01) |
| *H04W 4/00* | (2009.01) |
| *H04M 1/00* | (2006.01) |
| *H04W 76/02* | (2009.01) |
| *H04W 84/18* | (2009.01) |

(52) U.S. Cl.
CPC ......... *H04W 76/021* (2013.01); *H04W 4/008* (2013.01); *H04W 84/18* (2013.01)

(58) Field of Classification Search
CPC ..... H04B 5/02; H04B 5/0062; H04M 1/7253; H04M 2250/02; H04W 4/008; H04W 76/023
USPC ... 455/41.1, 41.2, 41.3, 226.1, 226.2, 552.1, 455/435.1, 435.2, 553.1; 370/310, 328
See application file for complete search history.

(56) References Cited

U.S. PATENT DOCUMENTS

| | | | | |
|---|---|---|---|---|
| 8,340,711 B1* | 12/2012 | Glass | .................. | H04W 4/22 455/552.1 |
| 8,477,645 B2* | 7/2013 | Scherzer | ............... | H04W 48/14 370/328 |
| 8,626,144 B2* | 1/2014 | Talty | .................... | H04W 4/008 455/41.2 |

(Continued)

FOREIGN PATENT DOCUMENTS

| | | |
|---|---|---|
| JP | 2011-182407 A | 9/2011 |
| JP | 2012-191646 A | 10/2012 |
| JP | 2013-190900 A | 9/2013 |

*Primary Examiner* — Quochien B Vuong
(74) *Attorney, Agent, or Firm* — Westerman, Hattori, Daniels & Adrian, LLP

(57) ABSTRACT

A wireless communication device includes a memory and a processor coupled to the memory and configured to receive, from a first device, a first identifier identifying the first device, the first device having a function of performing wireless communication, determine which of a first connection scheme and a second connection scheme is employed for the wireless communication based on the first identifier, the second connection scheme performing a connection after execution of selection processing in which the processor determines whether or not the wireless communication is started between the first device and the wireless communication device, and the first connection scheme performing the connection without the execution of the selection processing, and perform the connection between the wireless communication device and the first device using one of the first connection scheme and the second connection scheme in accordance with a result of a determination.

20 Claims, 11 Drawing Sheets

(56) References Cited

U.S. PATENT DOCUMENTS

| | | | |
|---|---|---|---|
| 8,666,313 B2* | 3/2014 | Preston | H04L 63/18 |
| | | | 370/310 |
| 2008/0013601 A1 | 1/2008 | Lind et al. | |
| 2014/0149873 A1 | 5/2014 | Wilson et al. | |
| 2015/0044970 A1* | 2/2015 | Park | H04M 1/7253 |
| | | | 455/41.2 |
| 2015/0081763 A1* | 3/2015 | Sipola | A61B 5/00 |
| | | | 709/203 |

* cited by examiner

FIG. 3

| SERVICE UUID | RSSI THRESHOLD VALUE |
|---|---|
| SPHYGMOMANOMETER | -65(dB) |
| THERMOMETER | -85(dB) |
| ... | ... |
| ... | ... |
| ... | ... |

FIG. 4

| SERVICE UUID | DEVICE ADDRESS |
|---|---|
| SPHYGMOMANOMETER | AA:BB:CC:DD:EE:FF |
|  | FF:EE:DD:CC:BB:AA |
| THERMOMETER | AA:AA:AA:AA:AA:AA |
|  | BB:BB:BB:BB:BB:BB |
| ... | ... |

151

WIRELESS COMMUNICATION DEVICE AND METHOD

CROSS-REFERENCE TO RELATED APPLICATION

This application is based upon and claims the benefit of priority of the prior Japanese Patent Application No. 2015-054769, filed on Mar. 18, 2015, the entire contents of which are incorporated herein by reference.

FIELD

The embodiments discussed herein are related to a wireless communication device.

BACKGROUND

Recently, the number of products that are compatible with Bluetooth Low Energy (hereinafter referred to as BLE) have been increasing. BLE is a communication system of version 4.0 of Bluetooth (registered trademark), which is standardized by Bluetooth Special Interest Group that is a standards body.

In BLE, a device that starts connection is called a central device, and a device that accepts the connection is called a peripheral device. For example, the central device is a terminal device (wireless communication device) such as a smartphone, and the peripheral device is a device (wireless communication device) such as a thermometer or a headphone.

In BLE, it is difficult to perform a connection from the peripheral device to the central device, and also difficult for the central device to accept the connection. In addition, the central device detects the peripheral device by receiving an Advertising packet that has been transmitted from the peripheral device.

Some connection modes are defined in BLE, and examples of the modes include an Auto Connection Establish Procedure (hereinafter referred to as Auto Connection) and a Selective Connection Establish Procedure (hereinafter referred to as Selective Connection). Each of Auto Connection and Selective Connection uses a list called a White List. The White List is a list defined by version 4.0 of Bluetooth, and in Auto Connection and Selective Connection, the address of peripheral device, the connection of which is allowed, is stored in the White List.

Auto Connection is, for example, a function that automatically performs connection of a device having an address which has been registered to the White List when the device is detected.

Selective Connection is, for example, a function that performs the connection of a device the address of which has been registered to the White List so that the device is selected by a user, an application, or the like when the device is detected.

As described above, Auto Connection does not execute processing of device selection, and the entire processing is smaller than that of Selective Connection, so that a reduction in power consumption of the central device may be achieved.

As a technology related to Bluetooth, for example, there are the following technologies.

That is, there is a technology related to a terminal device, by which connection is allowed to be performed when the radio field strength has a certain value or more in a case where Bluetooth connection is performed from a mobile terminal to the terminal device.

In such a technology, further improvement of the convenience of user authentication using Bluetooth may be achieved.

In addition, there is a technology related to a method of Bluetooth device auto pairing, by which significantly-low output electric power is used for a Bluetooth device, and the detection sensitivity of a signal of a device on which Bluetooth connection is performed is attenuated.

In such a technology, a procedure of pairing between a device and an accessory may be simplified.

In addition, there is a technology related to a device display method, by which a friendly name is obtained in the background while detected devices are displayed in a list in order of reception signal strength when addition of a device is performed.

In such a technology, the user may select a device to be added, without waiting for a friendly name to be obtained. These technologies are discussed, for example, in Japanese Laid-open Patent Publication No. 2013-190900, Japanese Laid-open Patent Publication No 2011-182407, Japanese Laid-open Patent Publication No. 2012-191646, and the like.

SUMMARY

According to an aspect of the invention, a wireless communication device includes a memory and a processor coupled to the memory and configured to receive, from a first device, a first identifier identifying the first device, the first device having a function of performing wireless communication, determine which of a first connection scheme and a second connection scheme is employed for the wireless communication based on the first identifier, the second connection scheme performing a connection after execution of selection processing in which the processor determines whether or not the wireless communication is started between the first device and the wireless communication device, and the first connection scheme performing the connection without the execution of the selection processing, and perform the connection between the wireless communication device and the first device using one of the first connection scheme and the second connection scheme in accordance with a result of a determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a connection limit target service list;

FIG. 4 is a diagram illustrating an example of a connection limit list;

DESCRIPTION OF EMBODIMENTS

The wireless communication device allows a use an application, or the like to select a connection device to be connected in Selective Connection, so that connection of a device that is not intended by the user is not performed. However, because the wireless communication device executes processing for selection of a connection device by the user or the application each time connection of the device is performed, the amount of processing is larger than that of Auto Connection, and the power consumption is higher than that in Auto Connection.

In the above-described technology related to a terminal device, by which connection is allowed to be performed when the radio field strength is a certain value or more, when connection of the device is performed, similar to connection by Selective Connection, an application selects a connection device and, as a result, power saving might not be achieved.

In addition, also, in the above-described technology related to the method of Bluetooth device auto pairing, when connection of the device is performed, similar to connection by Selective Connection, an application selects a connection device and, as a result, power saving might not be achieved.

In addition, in the above-described technology related to the device display method, by which a friendly name is obtained in the background, when connection of the device is performed, similar to connection by Selective Connection, the user selects a connection device and, as a result, power saving might not be achieved.

Thus, in any one of the above-described technologies, power saving might not be achieved.

An object of an embodiment is to provide a wireless communication device that achieves power saving.

Embodiments of the technology discussed herein are described below.

First Embodiment

Figure 1:
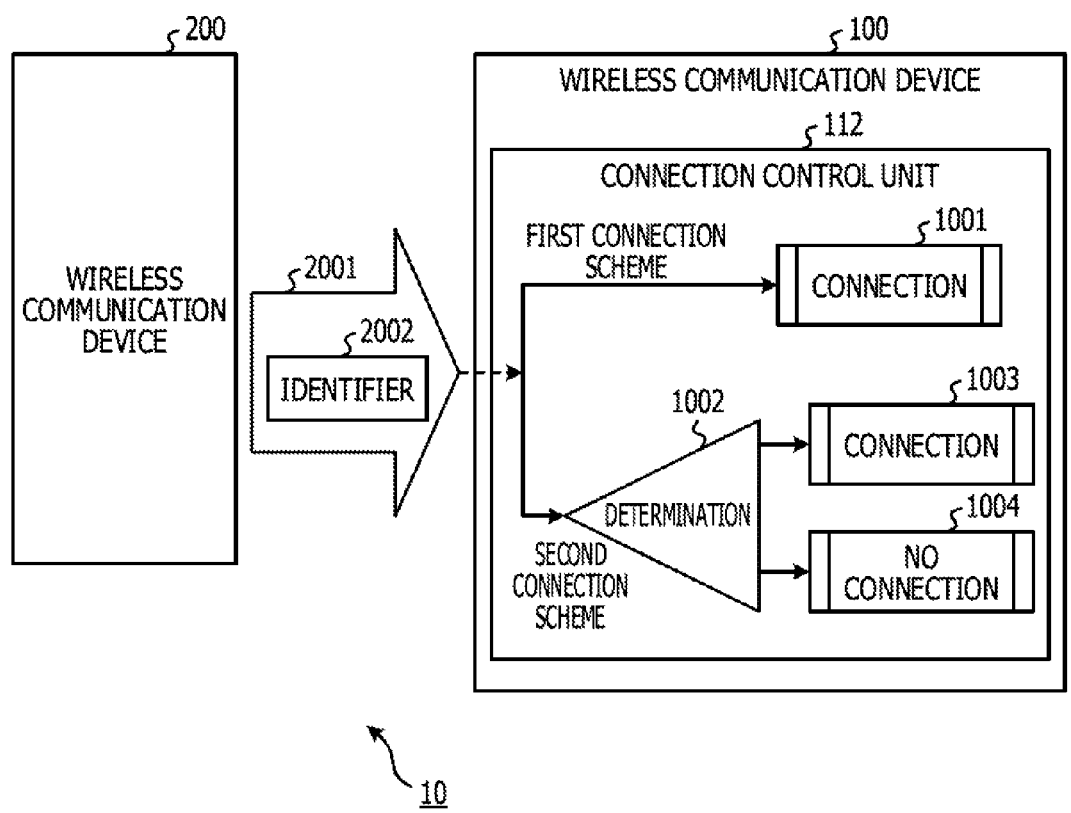
FIG. 1 is a diagram illustrating a configuration example of a wireless communication system.

FIG. 1 is a diagram illustrating a configuration example of a wireless communication system 10.

The wireless communication system 10 includes a wireless communication device 100 and a wireless communication device 200.

The wireless communication device 100 is, for example, a terminal device such as a smartphone. The wireless communication device 100 includes a connection control unit 112.

The connection control unit 112 receives, from the wireless communication device 200, data 2001 including an identifier 2002 used to identify the wireless communication device 200. The identifier 2002 is, for example, a Universally Unique Identifier (UUID) or a device address. The UUID is, for example, an identifier used to uniquely identify a service, a specification, a manufacturing company, or the like. In addition, transmission of the data 2001 is performed, for example, through packets. When the connection control unit 112 receives the data 2001, the connection control unit 112 determines a connection scheme with the wireless communication device 200, in accordance with the identifier 2002 included in the data 2001. The connection scheme may be, for example, a first connection scheme used to perform a connection without determining whether the connection is to be performed, by one of the user, the application, and the connection control unit 112, and a second connection scheme used to determine whether the connection to be is performed, by one of the user, the application, and the connection control unit 112 (1002). The connection control unit 112 determines the second connection scheme as the connection scheme, for example, when the identifier 2002 indicates a service content of the wireless communication device 200 used so as to be shared among a plurality of users. In the wireless communication device 200 used so as to be shared among a plurality of users, for example, when data to be transmitted includes personal information, it may be desirable that a certain device be uniquely determined as a transmission destination of the data, depending on the timing at which the wireless communication device 200 is used. When the connection control unit 112 determines the first connection scheme as the connection scheme, the connection control unit 112 executes connection processing 1001 using the first connection scheme. When the connection control unit 112 determines the second connection scheme as the connection scheme, the connection control unit 112 executes connection processing 1003 using the second connection scheme or does not perform connection (1004) in accordance with the determination (1002).

The wireless communication device 200 performs transmission of the data 2001 including the identifier 2002 used to identify the wireless communication device 200. Transmission of the data 2001 is performed, for example, through packets. In addition, for example, the packets are broadcast.

Because the wireless communication device 100 determines whether the connection is performed using the first connection scheme or the second connection scheme in accordance with the address or the UUID of the wireless communication device 200, connection of a certain number of devices is performed with the wireless communication device 100 using the first connection scheme. In the first connection scheme, because there is no processing performed for selection by the user, the application, or the connection control unit 112, power saving can be achieved to a greater degree than the second connection scheme.

In addition, in the second connection scheme, the user, the application, or the like, determines whether connection is performed, therefore improper connection with an unintended device can be avoided.

In addition, in the second connection scheme, for example, when the connection control unit 112 determines whether connection is performed, the processing in which whether the connection is performed is selected by the user may be omitted, so that the burden of work for the user is reduced.

Second Embodiment

A second embodiment is described below.

<Configuration Example of the Wireless Communication System>

Figure 10:
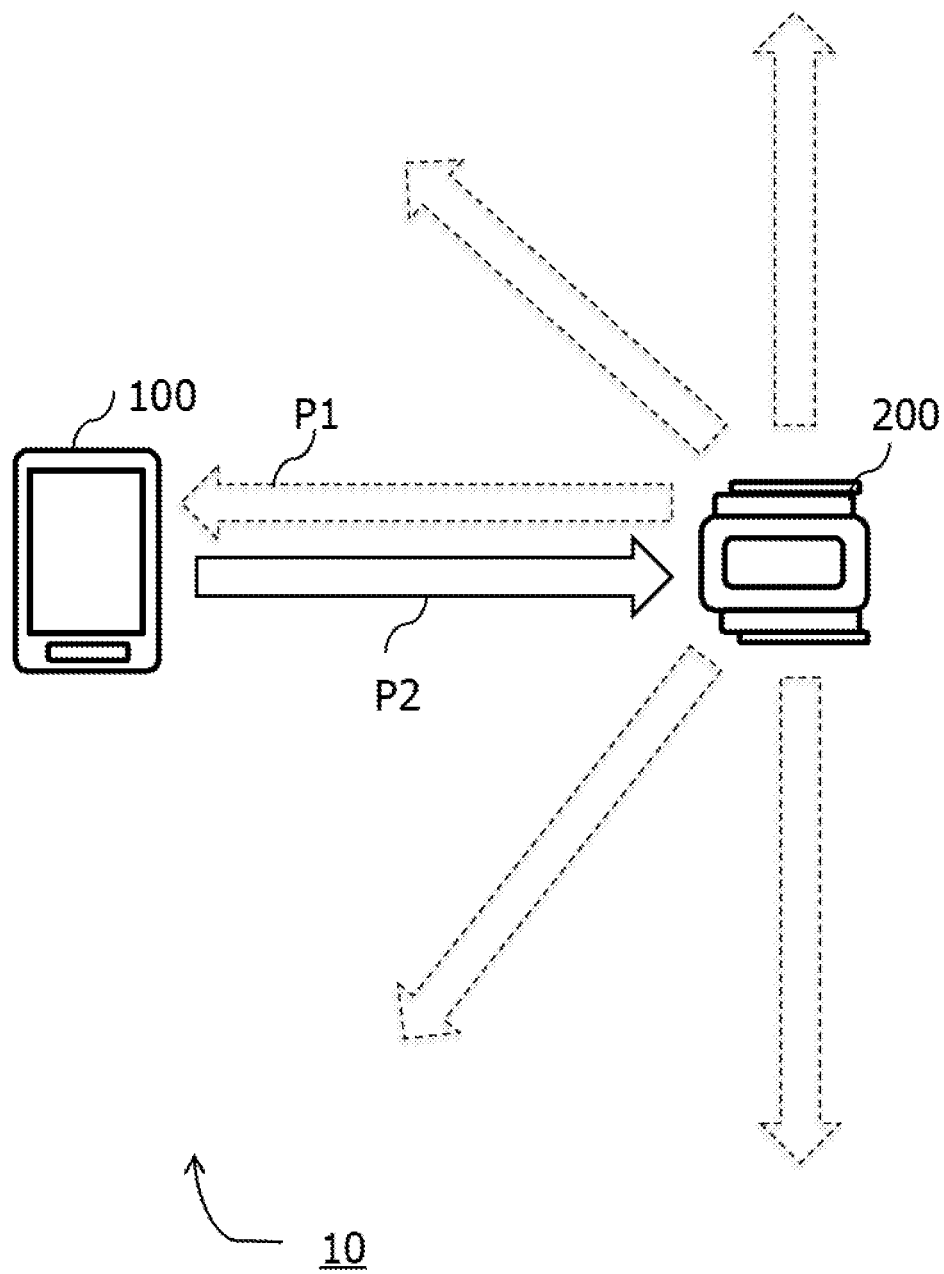
FIG. 10 is a diagram illustrating a configuration example of the wireless communication system.

FIG. 10 is a diagram illustrating a configuration example of a wireless communication system 10.

The wireless communication system 10 includes a central device 100, or a peripheral device 200.

The central device 100 is, for example, a terminal device such as a smartphone and a wireless communication device. For example, the central device 100 receives an Advertising packet (P1) that has been transmitted from the peripheral device 200, and detects the peripheral device 200. For example, when the central device 100 detects the peripheral device 200, the central device 100 transmits a connection request (P2) to the peripheral device 200, and performs connection with the peripheral device 200 wirelessly.

The peripheral device 200 is, for example, a wireless communication device such as a sphygmomanometer and a headphone. The peripheral device 200 is detected by the central device 100, so that, for example, the peripheral device 200 transmits an Advertising packet (P1) to the central device 100. In addition, when the peripheral device 200 receives a connection request that has been transmitted from the central device 100 (P2), the peripheral device 200 is connected to the central device 100 wirelessly.

For example, the central device 100 detects the peripheral device 200, and the central device 100 performs connection with the peripheral device 200. It is difficult for the peripheral device 200 to detect the central device 100. In addition, it is also difficult to perform a connection from the peripheral device 200 to the central device 100.

<Configuration Example of the Wireless Communication Device>

Figure 2:
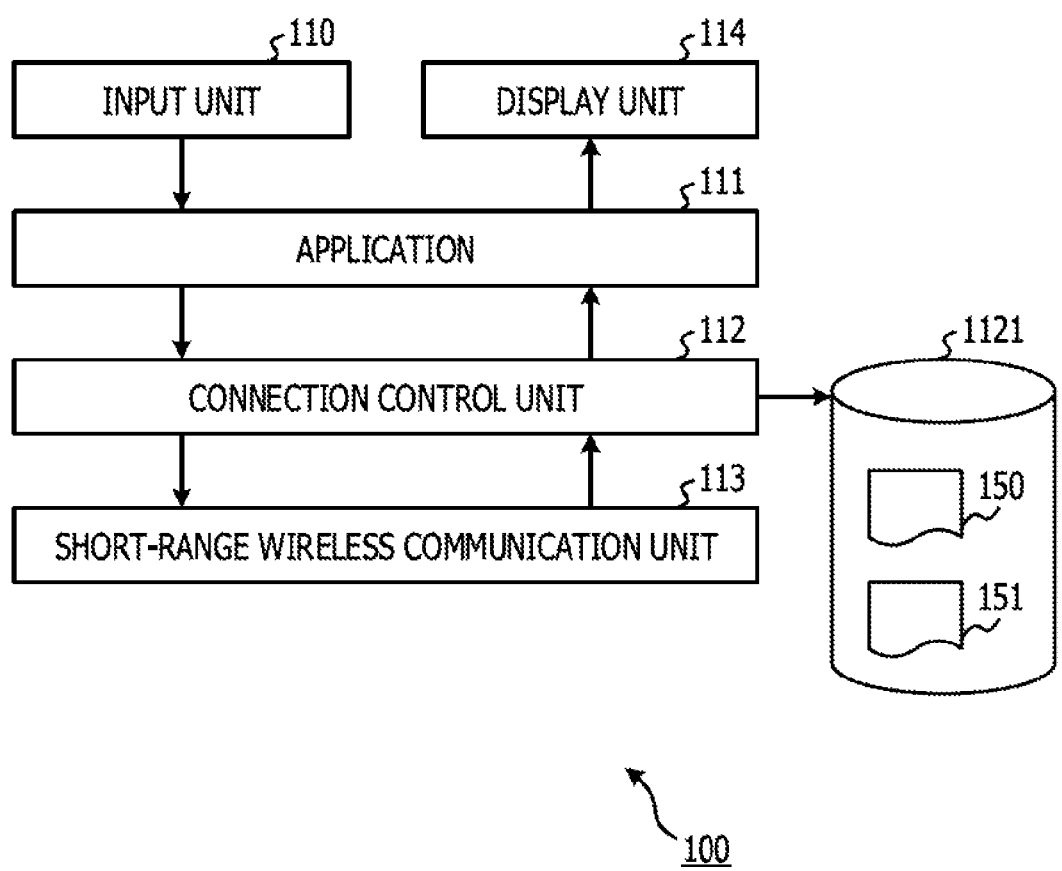
FIG. 2 is a diagram illustrating a configuration example of a wireless communication device.

FIG. 2 is a diagram illustrating a configuration example of the wireless communication device 100.

The wireless communication device 100 includes an input unit 110, an application 111, a connection control unit 112, a short-range wireless communication unit 113, and a display unit 114.

For example, the input unit 110 accepts a user operation such as selection of a device on which BLE connection is to be performed, by the user of the wireless communication device 100. In addition, for example, the input unit 110 outputs the address or the like of the device that has been selected by the user operation, to the application 111.

For example, the application 111 outputs a pairing request and a connection request for the device, to the connection control unit 112, based on information such as the address of the device, which has been received from the input unit 110. In addition, for example, the application 111 receives connection status change notification from the short-range wireless communication unit 113, outputs an automatic connection request to the connection control unit 112 depending on a change in the connection state with the remote device, and outputs the connection state to the display unit 114.

For example, when the connection control unit 112 receives the pairing request, the connection request, and the automatic connection request, from the application 111, the connection control unit 112 executes the pairing request, the connection request, and the automatic connection request, depending on the pairing state or the state of the connection limit list 151.

For example, the connection control unit 112 checks a UUID that has been received from the remote device at the time of connection, and determines whether or not the connection is performed by Auto Connection or Selective Connection. For example, the connection control unit 112 outputs an automatic connection request to the short-range wireless communication unit 113 or requests addition or deletion of a device to or from the White List, depending on the determination result.

Figure 11:
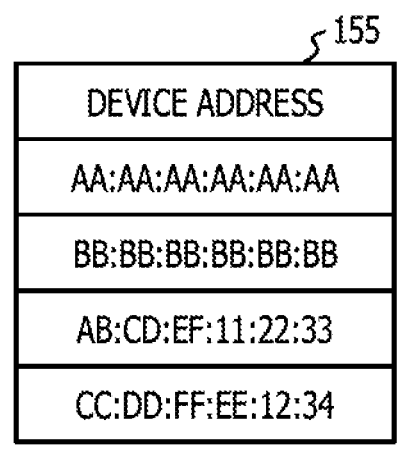
FIG. 11 is a diagram illustrating an example of a White List.

The White List is a list in which the address of a device that is a connection target is stored, for example, when the connection is performed by Auto Connection or Selective Connection. An example of the White List is described with reference to FIG. 11. As information stored in the White List, for example, there is a "device address". Here, the "device address" is, for example, the address of a device that is a connection target included in the Advertising packet. The device address of the target is added to the White List, for example, when an Advertising packet for a pairing request is received, or the connection is performed by Auto Connection or Selective Connection. In addition, the device address of the target is deleted from the White List, for example, when the pairing state is released.

The connection control unit 112 includes a device information management storage unit 1121. The device information management storage unit 1121 is, for example, a memory such as a random access memory (RAM). The device information management storage unit 1121 includes, for example, a connection limit target service list 150 and a connection limit list 151. The connection limit target service list 150 and the connection limit list 151 are described later.

For example, the short-range wireless communication unit 113 controls communication that complies with Bluetooth 4.0 standard. For example, the short-range wireless communication unit 113 scans an Advertising packet in response to a scan request from the connection control unit 112. For example, the short-range wireless communication unit 113 converts the Advertising packet that has been received so as to be scanned, into a baseband signal, and outputs the converted packet to the connection control unit 112. For example, the short-range wireless communication unit 113 outputs a Received Signal Strength Indicator (RSSI) value indicating reception power strength of the received Advertising packet, to the connection control unit 112. In addition, for example, when the short-range wireless communication unit 113 receives a connection request or an automatic connection request, from the connection control unit 112, the short-range wireless communication unit 113 starts communication with the remote device. In addition, for example, the short-range wireless communication unit 113 receives a request of addition or deletion of a device to or from the White List, from the connection control unit 112, the short-range wireless communication unit 113 performs addition or deletion of the target device to or from the White List.

<Connection Limit Target Service List and Connection Limit List>

As described above, the wireless communication device 100 includes the connection limit target service list 150 and the connection limit list 151. The respective lists are described below.

<1. Connection Limit Target Service List>

FIG. 3 is a diagram illustrating an example of the connection limit target service list 150.

The connection limit target service list 150 is, for example, a list indicating a correspondence relationship between an RSSI threshold value and a UUID of a target of Selective Connection.

As information stored in the connection limit target service list 150, for example, there are "service UUID" and "RSSI threshold value". Here, "service UUID" is, for example, a UUID of service that is the target of Selective Connection, and is a UUID of a sphygmomanometer, a thermometer, or the like. The device that is the target of Selective Connection is, for example, a device used so as to be shared among a plurality of users such as a sphygmomanometer or a thermometer, and is a device in which there is a probability that information is sent to a further user. Here, "RSSI threshold value" is, for example, a threshold value of RSSI used to determine whether the connection is performed, and the unit is dB or dBm. For example, when the RSSI value of the received Advertising packet is a threshold value or less, the connection control unit 112 determines that the connection is not performed.

For example, the connection limit target service list 150 is created by an operation of the user of the wireless communication device 100 in advance. In addition, the connection limit target service list 150 may be updated by the user of the wireless communication device 100, for example, when service that is a connection limit target has been changed.

In addition, for example, the connection limit target service list 150 may be configured to store a UUID of a target of Auto Connection. For example, when the connection by Auto Connection is performed, determination of an RSSI value is not performed, so that a threshold value for each UUID is not stored in the connection limit target service list 150. For example, when a UUID of the target of Auto Connection is stored in the connection limit target service list 150, the wireless communication device 100 stores a threshold value of RSSI used at the time of connection by Selective Connection, in an internal memory or the like.

<2. Connection Limit List>

FIG. 4 is a diagram illustrating an example of the connection limit list 151.

The connection limit list 151 is, for example, a list in which the address of the remote device that is a target of connection limit is stored at the time of automatic connection of BLE.

As information stored in the connection limit list 151, for example, there are "service UUID" and "device address". Here, "service UUID" is, for example, a UUID of service that is a target of connection limit, and a UUID of a sphygmomanometer, a thermometer, or the like. Here, "device address" is, for example, an address of a device including the service that is the target of connection limit. For example, it is assumed that the device address of the received Advertising packet is matched with a device address stored in the connection limit list 151. In this case, for example, the connection control unit 112 reads an RSSI threshold value of service UUID corresponding to the device address, from the connection limit target service list 150, and determines that the automatic connection is not performed when an RSSI value of the received Advertising packet is the threshold value or less.

For example, the connection limit list 151 is updated when pairing or first connection is performed with the remote device. For example, the wireless communication device 100 adds a device address included in the received Advertising packet to the connection limit list 151 when a UUID stored in the connection limit target service list 150 is matched with a UUID included in the received Advertising packet. In addition, an address of a device that is a connection limit target may be stored in the connection limit list 151 in advance.

In addition, the connection control unit 112 may delete the device address that has been registered to the connection limit list 151 as long as the device address corresponds to a UUID that is no longer the connection limit target service, for example, when the connection limit target service list 150 is updated. In addition, the device address that has been registered to the connection limit list 151 may be deleted by the user of the wireless communication device 100.

<Processing Flow of the Connection Control Unit>

A processing flow of the connection control unit 112 is described below.

Figure 5:
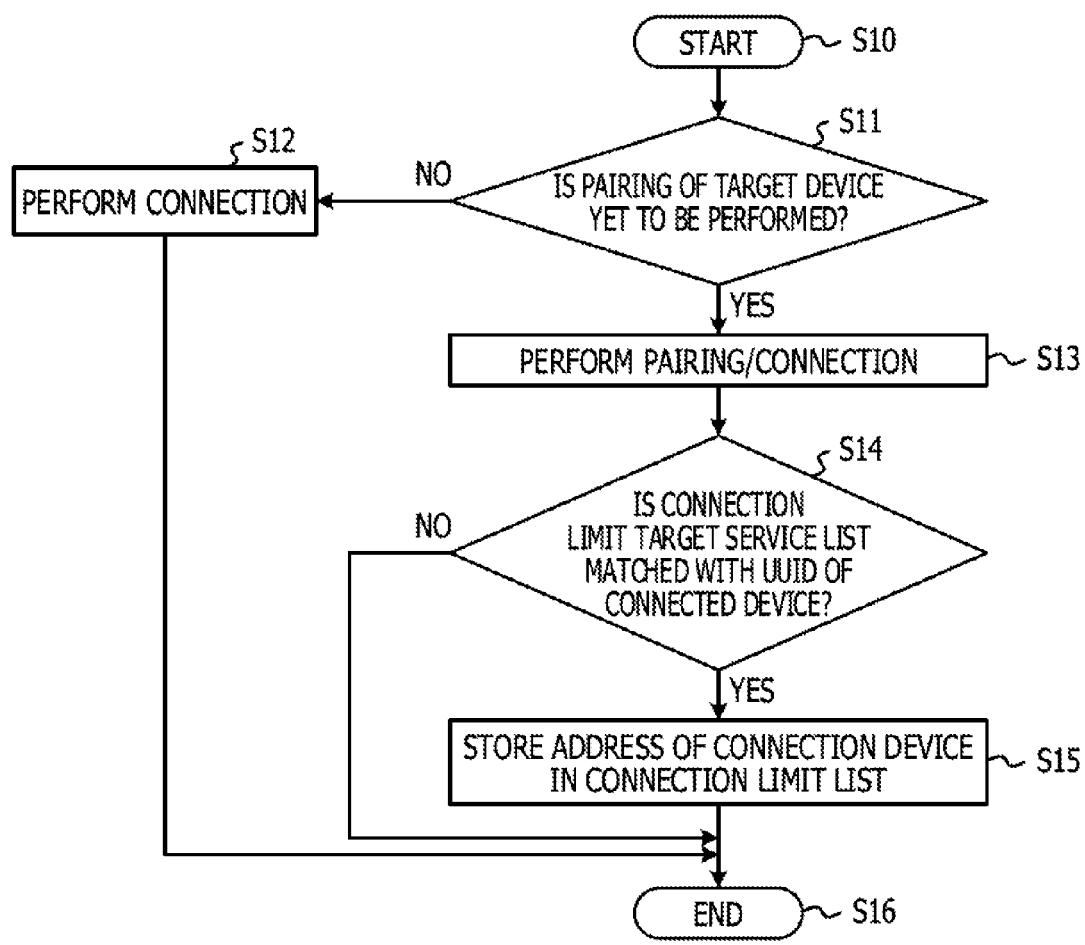
FIG. 5 is a diagram illustrating an example of a processing flow of a connection control unit.

FIG. 5 is a diagram illustrating an example of processing when a connection request and a pairing request have been received from the application 111. The pairing request is, for example, a request message for authentication at the time of first connection with the remote device. The connection request is, for example, not a request message for automatic connection of BLE, but a request message for connection of Bluetooth 4.0 standard.

Figure 6:
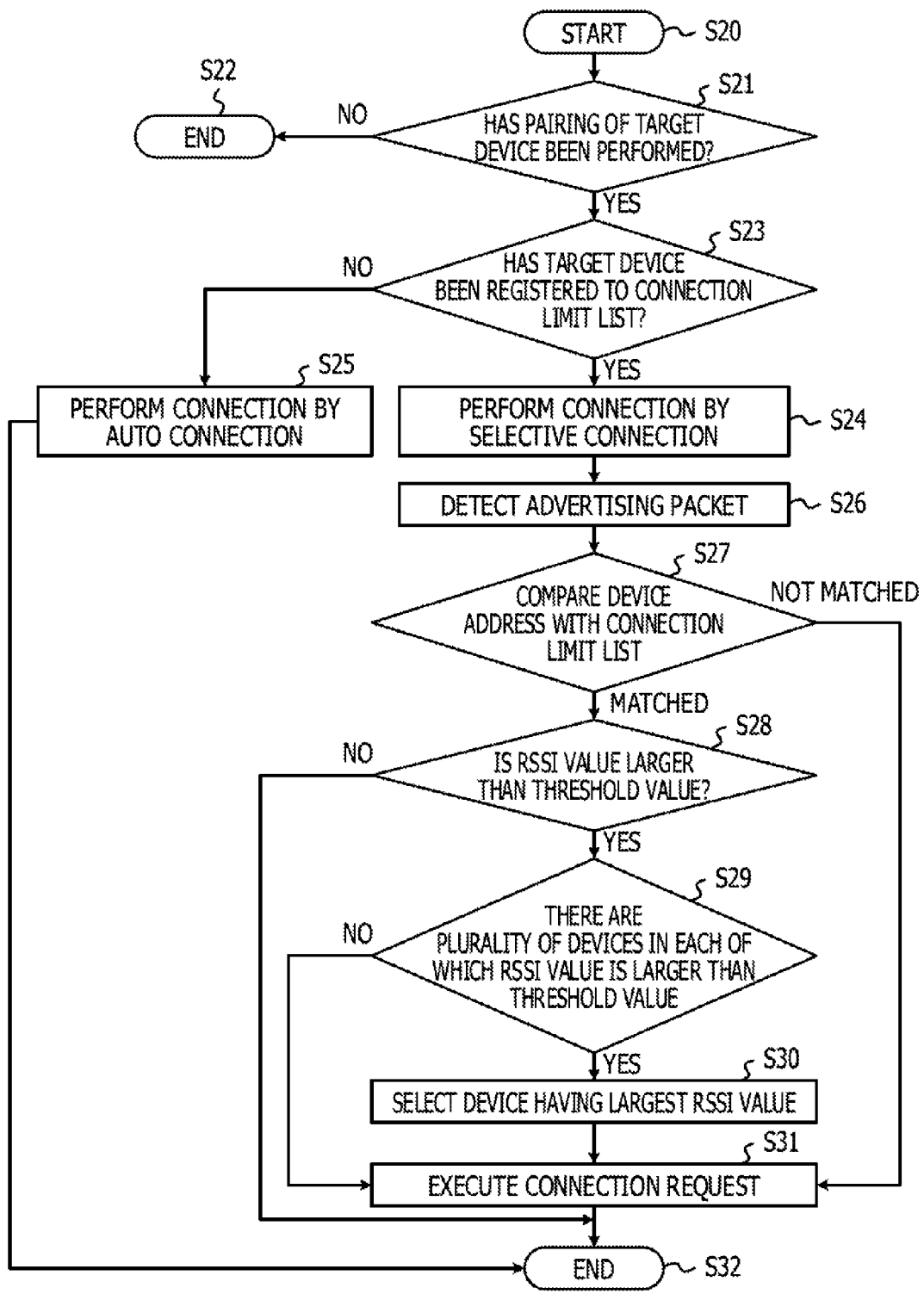
FIG. 6 is a diagram illustrating an example of a processing flow of a connection control unit.

FIG. 6 is a diagram illustrating an example of processing when an automatic connection request has been received from the application 111. The automatic connection request is, for example, a request message for automatic connection of BLE, and includes the address of a device that is a connection target.

<1. Processing Flow at the Time of Reception of a Pairing Request and a Connection Request>

Processing at the time of reception of a pairing request and a connection request is described with reference to FIG. 5.

When the connection control unit 112 receives a pairing request or a connection request from the application 111 (S10), the connection control unit 112 checks the pairing state of a connection target device (S11). When pairing of the connection target device has been performed ("No" in S11), the connection control unit 112 performs connection with the connection target device (S12), so that, for example, the connection control unit 112 outputs a connection request to the short-range wireless communication unit 113, and the processing ends (S16). When pairing of the connection target device is yet to be performed ("Yes" in S11), the connection control unit 112 outputs a pairing request or a connection request to the short-range wireless communication unit 113, for example, in order to perform the pairing and the connection (S13).

The connection control unit 112 determines whether a UUID stored in "service UUID" of the connection limit target service list 150 is matched with a UUID that has been received from the short-range wireless communication unit 113, which has been received from the remote device at the time of connection (S14). When the UUIDs are matched with each other ("Yes" in S14), the connection control unit 112 stores the UUID that has been received from the short-range wireless communication unit 113, which has been received from the remote device at the time of connection, in the connection limit list 151. When the UUIDs are matched with each other ("Yes" in S14), the connection control unit 112 further stores a device address that has been received from the short-range wireless communication unit 113, which has been received from the remote device at the time of connection, in the connection limit list 151, and the processing ends (S16). When the UUIDs are not matched with each other ("No" in S14), in the connection control unit 112, the processing ends (S16).

<2. Processing Flow at the Time of Reception of an Automatic Connection Request>

Processing at the time of reception of an automatic connection request is described below with reference to FIG. 6.

When the connection control unit 112 receives an automatic connection request from the application 111 (S20), the connection control unit 112 checks the pairing state of the connection target device (S21). When pairing of the connection target device is yet to be performed ("No" in S21), in the connection control unit 112, the processing ends (S22). In addition, for example, in a case in which the automatic connection request includes a plurality of connection target devices, when there is no connection target device in which the pairing has been performed ("No" in S21), in the connection control unit 112, the processing ends (S22). When there is one or more connection target devices in each of which the pairing has been performed ("Yes" in S21), the connection control unit 112 compares the connection limit list 151 with the target device address (S23). When even the address of a single connection target device has been registered to the connection limit list 151 ("Yes" in S23), the connection control unit 112 performs the connection by Selective Connection (S24). In addition, when no address of a connection target device is registered to the connection limit list 151 ("No" in S23), the connection control unit 112 performs the automatic connection by Auto Connection (S25). When the connection control unit 112 performs the automatic connection by Auto Connection (S25), for example, the connection control unit 112 requests the short-range wireless communication unit 113 to performs the automatic connection by Auto Connection, and the processing ends (S32).

In S23, for example, when the automatic connection request includes a UUID of the connection target device, the connection control unit 112 may compares the connection limit target service list 150 with the UUID. In this case, for example, the connection limit target service list 150 is matched with the UUID, the flow proceeds to "Yes" of S23.

After that, the connection control unit 112 receives a database signal of the Advertising packet, from the short-range wireless communication unit 113 (S26). The connection control unit 112 compares a device address included in the database signal of the Advertising packet with a device address stored in the connection limit list 151 (S27). When the device addresses are not matched with each other ("Not matched" in S27), the connection control unit 112 outputs a connection request to the short-range wireless communication unit 113 (S31), and the processing ends (S32).

When the device addresses are matched with each other ("Matched" in S27), the connection control unit 112 compares an RSSI value of the received Advertising packet with a threshold value (S28). The connection control unit 112 receives the RSSI value from the short-range wireless communication unit 113. In addition, the connection control unit 112 obtains the threshold value by reading a UUID corresponding to the device address from the connection limit list 151, and reading a threshold value corresponding to the UUID from the connection limit target service list 150. When the RSSI value is the threshold value or less ("No" in S28), in the connection control unit 112, the processing ends without performing the connection (S32).

When the RSSI value is larger than the threshold value ("Yes" in S28), the connection control unit 112 checks the number of devices in each of which the RSSI value is larger the threshold value (S29). When there is a plurality of devices in each of which the RSSI value is larger than the threshold value ("Yes" in S29), the connection control unit 112 selects a device having the largest RSSI value as a device that is the connection target (S30), and outputs a connection request to the short-range wireless communication unit 113 (S31), and the processing ends (S32). When there is a single device in which the RSSI value is larger than the threshold value ("No" in S29), the connection control unit 112 outputs a connection request to the short-range wireless communication unit 113 (S31), and the processing ends (S32).

The wireless communication device 100 determines whether the connection is performed by Auto Connection or Selective Connection, depending on an address or a UUID of the remote device. Therefore, connection of devices having a certain number is performed by Auto Connection, so that power saving of the wireless communication device 100 may be achieved.

In addition, when a connection is performed by Selective Connection, it is determined whether the connection is performed, based on the RSSI value of the received Advertising packet. The wireless communication device 100 may suppress connection with a device that exists at a position away from the wireless communication device 100 by a certain distance or more, and that is unintended by the user, by performing connection with a device in which the RSSI value is larger than the threshold value. In addition, the determination of whether a connection is performed is made by the connection control unit 112 of the wireless communication device 100, so that the selection processing of a connection device by the user is omitted, and the burden of work for the user is reduced.

In addition, due to provision of a threshold value for each UUID, for example, a threshold value may be set depending on strength of transmission power of the remote device. In addition, for example, for a device that is assumed to be used so as to be located away from the wireless communication device 100 by a certain distance or more, a threshold value may be set low.

In addition, in a case in which there are a plurality of target devices, when a device having the largest RSSI value is set as a device that is a connection target, connection of a device that is located the nearest the wireless communication device 100 is achieved. Therefore, even when a device that is not intended by the user exists within a distance in which an RSSI value is a threshold value or less, it may be suppressed that the connection is performed.

<Sequence>

The above-described processing is described with reference to a connection sequence between the wireless communication device 100 and each of the plurality of remote devices 200-1 and 200-2.

Figure 8:
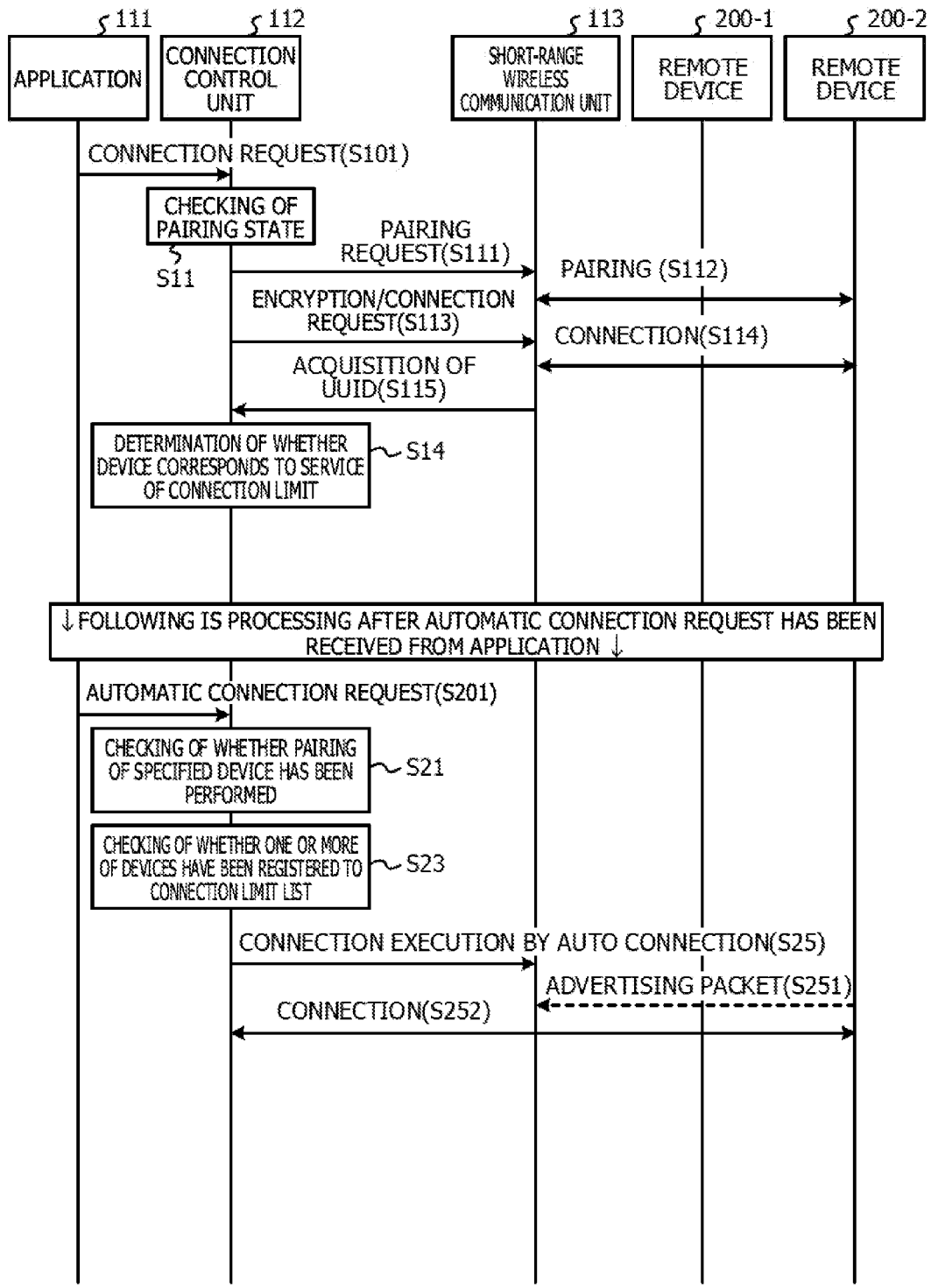
FIG. 8 is a diagram illustrating an example of a connection sequence of BLE.

FIG. 8 is a diagram illustrating a sequence example in which connection by Auto Connection is performed with the remote device 200-2. The remote device 200-2 includes, for example, a UUID that does not correspond to a target of connection limit such as a headphone or the like.

Figure 7:
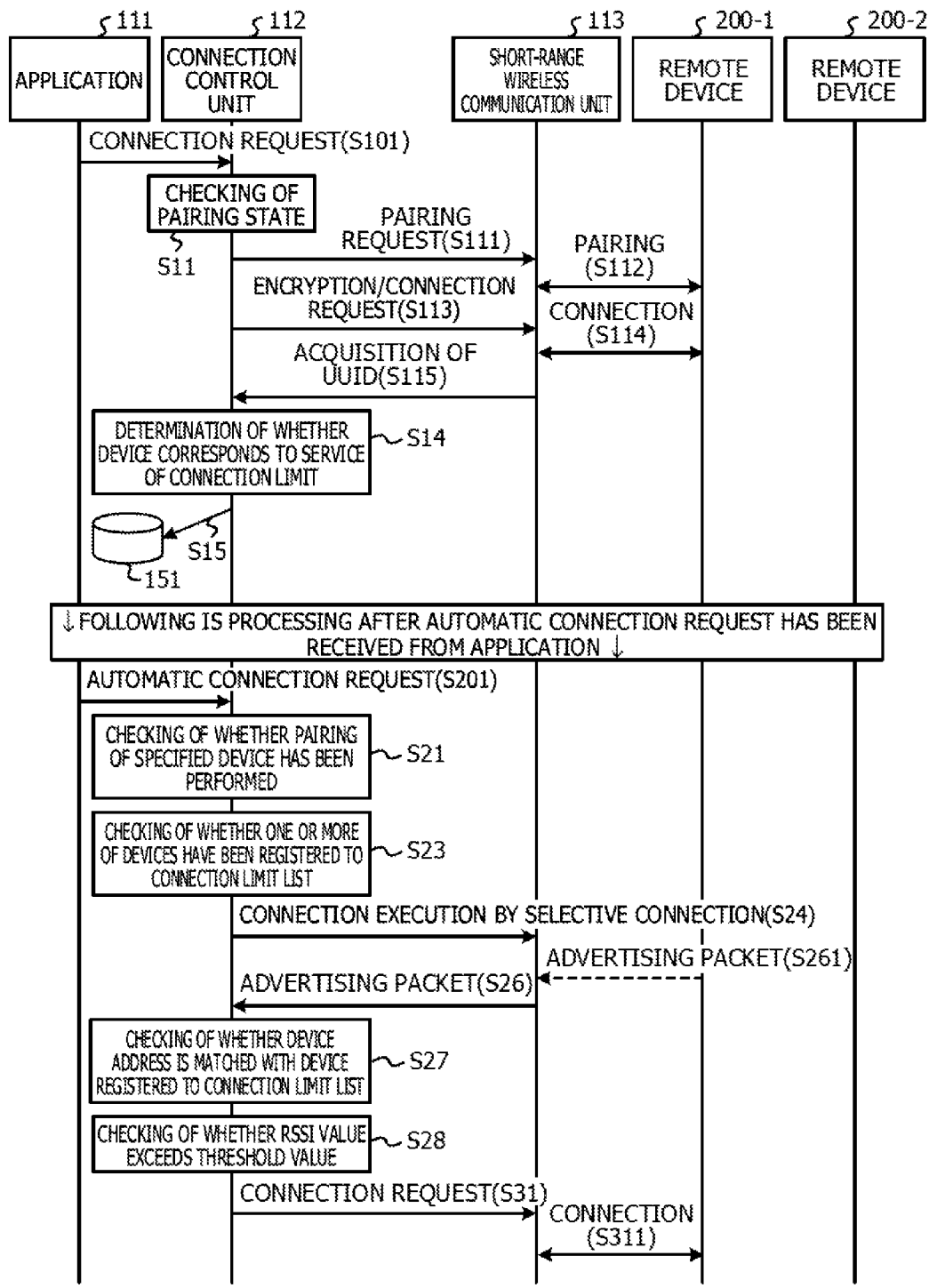
FIG. 7 is a diagram illustrating an example of a connection sequence of BLE.

FIG. 7 is a diagram illustrating a sequence example in which connection by Selective Connection is performed with the remote device 200-1. The remote device 200-1 includes, for example, a UUID that corresponds to a target of connection limit such as a thermometer, a sphygmomanometer, or the like.

<1. Connection Sequence by Auto Connection>

Connection with the remote device 200-2 is described below with reference to FIG. 8.

When the connection control unit 112 receives a connection request from the application 111 (S101), the connection control unit 112 checks the pairing state of a target device (S11). When pairing of the target device is yet to be performed, the connection control unit 112 outputs a pairing request to the short-range wireless communication unit 113 (S111). When the short-range wireless communication unit 113 receives the pairing request (S111), the short-range wireless communication unit 113 performs pairing with the remote device 200-2 (S112). When the connection control unit 112 outputs an encryption and connection request to the short-range wireless communication unit 113 (S113), the short-range wireless communication unit 113 performs connection with the remote device 200-2 (S114). The short-range wireless communication unit 113 obtains a UUID of the remote device 200-2 in the connection (S114), and outputs the obtained UUID to the connection control unit 112 (S115). When the connection control unit 112 obtains the UUID (S115), the connection control unit 112 checks whether the UUID corresponds to target service of connection limit (S14). The connection control unit 112 determines that the UUID does not correspond to the target service of connection limit, and the processing for connection request (S101) ends.

After that, the connection control unit 112 receives an automatic connection request from the application 111 (S201). The connection control unit 112 that has received the automatic connection request (S201) checks the pairing state of the target device (S21). When the target device is in a state in which the pairing has been performed, the connection control unit 112 checks whether the device has been registered to the connection limit list 151 (S23). The remote device 200-2 is not registered to the connection limit list 151, so that the connection control unit 112 performs connection by Auto Connection (S25). When the short-range wireless communication unit 113 is requested to perform a connection by Auto Connection (S25), the short-range wireless communication unit 113 detects the remote device 200-2 by receiving the Advertising packet (S251), and performs automatic connection with the remote device 200-2 (S252).

As described above, when connection by Auto Connection is performed under a certain condition, power saving of the wireless communication device 100 may be achieved.

<2. Connection Sequence by Selective Connection>

Connection with the remote device 200-1 is described below with reference to FIG. 7.

When the connection control unit 112 receives a connection request from the application 111 (S101), the connection control unit 112 checks the pairing state of a target device (S11). When pairing of the target device is yet to be performed, the connection control unit 112 outputs a pairing request to the short-range wireless communication unit 113 (S111). When the short-range wireless communication unit 113 receives the pairing request (S111), the short-range wireless communication unit 113 performs pairing with the remote device 200-1 (S112). When the connection control unit 112 outputs an encryption and connection request to the short-range wireless communication unit 113 (S113), the short-range wireless communication unit 113 performs connection with the remote device 200-1 (S114). The short-range wireless communication unit 113 obtains a UUID of the remote device 200-1 in the connection (S114), outputs the obtained UUID to the connection control unit 112 (S115). When the connection control unit 112 obtains the UUID (S115), the connection control unit 112 checks whether the UUID corresponds to target service of connection limit (S14). The determination of whether the UUID corresponds to the target service of connection limit (S14) is made, for example, depending on whether "service UUID" of the connection limit target service list 150 is matched with the obtained UUID. When the connection control unit 112 determines that the UUID corresponds to the target service of the connection limit, the connection control unit 112 stores the address of the remote device 200-1 and the obtained UUID, in the connection limit list 151 (S15), and the processing for the connection request (S101) ends.

After that, for example, the connection control unit 112 receives an automatic connection request (S201), from the application 111. The connection control unit 112 that has received the automatic connection request (S201) checks the pairing state of the target device (S21). When the target device is in the state in which the pairing has been performed, the connection control unit 112 checks whether the target device has been registered to the connection limit list 151 (S23). The address of the remote device 200-1 is stored in the connection limit list 151 in S15, and the connection control unit 112 performs connection by the Selective Mode (S24). When the short-range wireless communication unit 113 receives an Advertising packet that has been transmitted from the remote device 200-1 (S261), the short-range wireless communication unit 113 converts the Advertising packet into a baseband signal, and outputs the converted signal to the connection control unit 112 (S16). The connection control unit 112 checks whether a device address included in the signal of the Advertising packet is matched with a device address stored in the connection limit list 151 (S27). The address of the remote device 200-1 is registered to the connection limit list 151, so that the connection control unit 112 determines that the device addresses are matched with each other. When the device addresses are matched with each other, the connection control unit 112 compares an RSSI value of the received Advertising packet with a threshold value (S28). The threshold value may be obtained, for example, by reading a UUID corresponding to the target device from the connection limit list 151, and reading a threshold value corresponding to the read UUID from the connection limit target service list 150. When the RSSI value exceeds the threshold value, and there is no further device in which the RSSI value exceeds the threshold value, the connection control unit 112 determines that connection of the target device is performed, and outputs a connection request to the short-range wireless communication unit 113 (S31). When the short-range wireless communication unit 113 receives the connection request (S31), the short-range wireless communication unit 113 performs connection with the remote device 200-1 (S311).

As described above, in Selective Connection, when connection of a device in which an RSSI value of an Advertising packet is a threshold value or less is not performed, connection with a device that is located away from the wireless communication device 100 and that is not intended to be connected by the user may be suppressed.

Other Embodiment

Other embodiments are described below.

Figure 9:
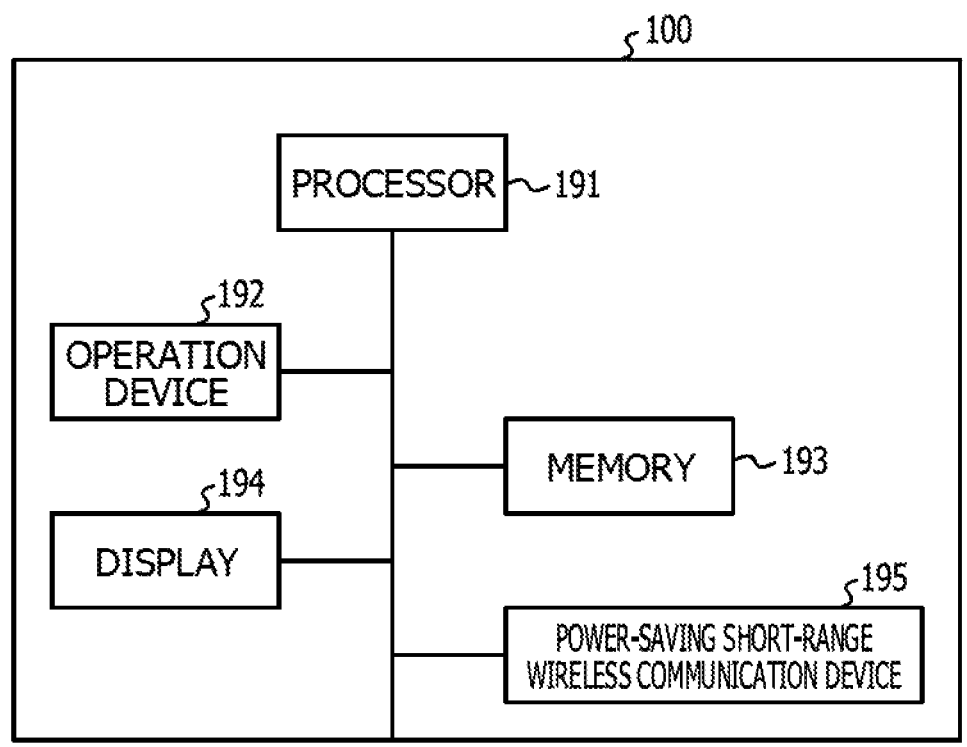
FIG. 9 is a diagram illustrating a hardware configuration example of the wireless communication device.

FIG. 9 is a diagram illustrating a hardware configuration example of the wireless communication device 100.

The wireless communication device 100 includes a processor 191, an operation device 192, a memory 193, a display 194, and a power-saving short-range wireless communication device 195.

The processor 191 is, for example, a controller such as a Central Processing Unit (CPU), a Micro Processing Unit (MPU), or a Field Programmable Gate Array (FPGA). For example, the processor 191 loads a program stored in the memory 193, and executes the loaded program. The processor 191 corresponds to, for example, the application 111 and the connection control unit 112 according to the second embodiment.

The operation device 192 is, for example, a touch panel. The operation device 192 corresponds to, for example, the input unit 110 according to the second embodiment.

The memory 193 is, for example, a memory such as a Random Access Memory (RAM) or a Read Only Memory (ROM). The memory 193 stores, for example, the program, the connection limit target service list 150, and the connection limit list 151. The memory 193 corresponds to, for example, the device information management storage unit 1121 according to the second embodiment.

The display 194 is, for example, a liquid crystal display. The display 194 corresponds to, for example, the display unit 114 according to the second embodiment.

The power-saving short-range wireless communication device 195 is, for example, a connection control chip that is compatible with version 4.0 of Bluetooth. The power-saving short-range wireless communication device 195 corresponds to, for example, the short-range wireless communication unit 113 according to the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device, comprising:
   a memory; and
   a processor coupled to the memory and configured to:
      receive, from a first device and a second device, a first identifier identifying the first device and a second identifier identifying the second device, respectively, the first device and the second device having a function of performing a first wireless communication between the wireless communication device and the first device and a second wireless communication between the wireless communication device and the second device, respectively,
      determine which of a first connection scheme and a second connection scheme is used for the first wireless communication and the second wireless communication based on the first identifier and the second identifier, respectively, the second connection scheme performing a connection after execution of selection processing in which the processor determines whether or not each of the first wireless communication and the second wireless communication is started, and the first connection scheme performing the connection without the execution of the selection processing,
      when it is determined that the second connection scheme is used for both the first wireless communication and the second wireless communication, measure a first strength of a first signal received from the first device and a second strength of a second signal received from the second device, respectively, and
      when the first strength is larger than the second strength, perform the connection between the wireless communication device and the first device using the second connection scheme while not to perform the connection between the wireless communication device and the second device.

2. The wireless communication device according to claim 1, wherein the processor is configured to:
   store the first identifier into the memory when the first device is a device shared among a plurality of users, and
   employ the second connection scheme when the first identifier is stored in the memory.

3. The wireless communication device according to claim 2, wherein the processor is configured to:
   determine that the first identifier is not stored in the memory when the first device is not the device shared among the plurality of users, and
   employ the first connection scheme when the first identifier is not stored in the memory.

4. The wireless communication device according to claim 1, wherein the memory stores at least one of an identifier of a device for which the second scheme is employed and another identifier of another device for which the first scheme is employed.

5. The wireless communication device according to claim 1, wherein the processor is configured to:
   obtain an electric power value indicating a reception power strength when the first identifier is received, and
   perform the connection of the wireless communication device with the first device using the second connection scheme when it is determined that the second connection scheme is employed, and the electric power value is a threshold value or more.

6. The wireless communication device according to claim 5, wherein the threshold value is set depending on characteristics of a plurality of devices including the first device.

7. The wireless communication device according to claim 5, wherein the processor is configured to:
   receive, from a second device, a second identifier identifying the second device, the second device having a function to perform the wireless communication,
   compare the electric power value related to the first device with another electric power value related to the second device when it is determined that the second connection scheme is employed for the first device, and the second connection scheme is employed for the second device, and
   perform the connection of the wireless communication device with the first device using the second connection scheme when the electric power value is larger than the another electric power value.

8. A wireless communication method, comprising:
   receiving, from a first device and a second device, a first identifier identifying the first device and a second identifier identifying the second device, respectively, the first device and the second device having a function of performing a first wireless communication between the wireless communication device and the first device and a second wireless communication between the wireless communication device and the second device, respectively;
   determining, by a processor, which of a first connection scheme and a second connection scheme is used for the first wireless communication and the second wireless communication based on the first identifier and the second identifier, respectively, the second connection scheme performing a connection after execution of selection processing in which the processor determines whether or not each of the first wireless communication and the second wireless communication is started, and the first connection scheme performing the connection without the execution of the selection processing;
   measuring a first strength of a first signal received from the first device and a second strength of a second signal received from the second device, respectively, when it is determined that the second connection scheme is used for both the first wireless communication and the second wireless communication, and performing the connection between the wireless communication device and the first device using the second connection scheme while not to perform the connection between the wireless communication device and the second device, when the first strength is larger than the second strength.

9. The wireless communication method according to claim 8, further comprising:
storing the first identifier into a memory when the first device is a device shared among a plurality of users; and
employing the second connection scheme when the first identifier is stored in the memory.

10. The wireless communication method according to claim 9, further comprising:
determining that the first identifier is not stored in the memory when the first device is not the device shared among the plurality of users; and
employing the first connection scheme when the first identifier is not stored in the memory.

11. The wireless communication method according to claim 8, further comprising:
storing, into a memory, at least one of an identifier of a device for which the second scheme is employed and another identifier of another device for which the first scheme is employed.

12. The wireless communication method according to claim 8, further comprising:
obtaining an electric power value indicating a reception power strength when the first identifier is received; and
performing the connection of the wireless communication device with the first device using the second connection scheme when it is determined that the second connection scheme is employed, and the electric power value is a threshold value or more.

13. The wireless communication method according to claim 12, wherein the threshold value is set depending on characteristics of a plurality of devices including the first device.

14. The wireless communication method according to claim 12, further comprising:
receiving, from a second device, a second identifier identifying the second device, the second device having a function to perform the wireless communication;
comparing the electric power value related to the first device with another electric power value related to the second device when it is determined that the second connection scheme is employed for the first device, and the second connection scheme is employed for the second device; and
performing the connection of the wireless communication device with the first device using the second connection scheme when the electric power value is larger than the another electric power value.

15. A non-transitory computer-readable storage medium storing wireless communication program which causes a computer to execute a process, the process comprising:
receiving, from a first device and a second device, a first identifier identifying the first device and a second identifier identifying the second device, respectively, the first device and the second device having a function of performing a first wireless communication between the wireless communication device and the first device and a second wireless communication between the wireless communication device and the second device, respectively;
determining, by a processor, which of a first connection scheme and a second connection scheme is used for the first wireless communication and the second wireless communication based on the first identifier and the second identifier, respectively, the second connection scheme performing a connection after execution of selection processing in which the processor determines whether or not each of the first wireless communication and the second wireless communication is started, and the first connection scheme performing the connection without the execution of the selection processing;
measuring a first strength of a first signal received from the first device and a second strength of a second signal received from the second device, respectively, when it is determined that the second connection scheme is used for both the first wireless communication and the second wireless communication, and
performing the connection between the wireless communication device and the first device using the second connection scheme while not to perform the connection between the wireless communication device and the second device, when the first strength is larger than the second strength.

16. The non-transitory computer-readable storage medium according to claim 15, the process further comprising:
storing the first identifier into a memory when the first device is a device shared among a plurality of users; and
employing the second connection scheme when the first identifier is stored in the memory.

17. The non-transitory computer-readable storage medium according to claim 16, the process further comprising:
determining that the first identifier is not stored in the memory when the first device is not the device shared among the plurality of users; and
employing the first connection scheme when the first identifier is not stored in the memory.

18. The non-transitory computer-readable storage medium according to claim 15, the process further comprising:
storing, into a memory, at least one of an identifier of a device for which the second scheme is employed and another identifier of another device for which the first scheme is employed.

19. The non-transitory computer-readable storage medium according to claim 15, the process further comprising:
obtaining an electric power value indicating a reception power strength when the first identifier is received; and
performing the connection of the wireless communication device with the first device using the second connection scheme when it is determined that the second connection scheme is employed, and the electric power value is a threshold value or more.

20. The non-transitory computer-readable storage medium according to claim 19, wherein the threshold value is set depending on characteristics of a plurality of devices including the first device.

* * * * *